United States Patent
Eckstein et al.

(10) Patent No.: US 6,777,466 B2
(45) Date of Patent: Aug. 17, 2004

(54) FLAME RETARDANT THERMOPLASTIC POLYURETHANE CONTAINING MELAMINE CYANURATE

(75) Inventors: Yona Eckstein, Kent, OH (US); Larry Edward Hewitt, Vermilion, OH (US); Bela B. Fudala, Maastricht (NL)

(73) Assignee: Noveon IP Holdings Corp., Cleveland, OH (US)

( * ) Notice: Subject to any disclaimer, the term of this patent is extended or adjusted under 35 U.S.C. 154(b) by 0 days.

(21) Appl. No.: 10/072,088

(22) Filed: Feb. 8, 2002

(65) Prior Publication Data

US 2003/0166749 A1 Sep. 4, 2003

(51) Int. Cl.$^7$ ................... C08K 5/3492; C08K 5/52; C08K 5/53
(52) U.S. Cl. ................. 524/100; 524/123; 524/127; 428/421; 428/522; 428/523
(58) Field of Search ................. 524/100, 123, 524/127; 428/421, 522, 523

(56) References Cited

U.S. PATENT DOCUMENTS

| | | | |
|---|---|---|---|
| 4,131,731 A | 12/1978 | Lai et al. ................... 528/370 |
| 4,321,189 A | 3/1982 | Ohshita et al. ............. 524/101 |
| 5,010,133 A | * 4/1991 | Seville ....................... 524/871 |
| 5,037,869 A | 8/1991 | Sprenkle, Jr. ............... 524/100 |
| 5,110,850 A | 5/1992 | Farkas ........................ 524/100 |
| 5,494,990 A | * 2/1996 | Tagawa et al. ............... 528/73 |
| 5,684,071 A | 11/1997 | Mogami et al. ............. 524/100 |
| 5,837,760 A | * 11/1998 | Hackl et al. ................. 524/127 |
| 5,900,439 A | * 5/1999 | Prissok et al. .............. 521/128 |
| 5,959,059 A | * 9/1999 | Vedula et al. ................ 528/76 |

FOREIGN PATENT DOCUMENTS

| | | |
|---|---|---|
| EP | 0389768 | 10/1990 |
| JP | 52152950 | 12/1977 |

* cited by examiner

Primary Examiner—Kriellion A. Sanders
(74) Attorney, Agent, or Firm—Joe A. Powell; Thoburn T. Dunlap

(57) ABSTRACT

Flame retardant thermoplastic polyurethane (TPU) compositions are disclosed having melamine cyanurate as the only organic flame retardant additive. Processes are disclosed to make the TPU compositions and to make wire and cable constructions having the TPU compositions as the jacket of the wire and cable constructions. The TPU compositions have excellent physical properties and are capable of passing both the UL-1581 section 1080 and UL-1581 section 1080, subject 758, section G tests for wire and cable constructions. The levels of melamine cyanurate used in the TPU compositions are from about 28 to about 50 weight percent of the TPU composition. The ultimate tensile strength of the TPU composition is greater than 1500 psi and preferably greater than 2900 psi. The TPU compositions also have both a low LOI % and a low peak rate of heat release.

29 Claims, No Drawings

FLAME RETARDANT THERMOPLASTIC POLYURETHANE CONTAINING MELAMINE CYANURATE

FIELD OF THE INVENTION

The present invention relates to flame retardant thermoplastic polyurethane (TPU) compositions comprising melamine cyanurate at high levels as the only organic flame retardant additive, while maintaining high tensile strength of the TPU compositions. The TPU compositions are useful for applications where low flame properties are desirable, such as wire and cable applications, blown film, molding applications, and the like. This invention also relates to process to produce the TPU compositions in a twin screw extruder and process to produce wire and cable jacketing.

BACKGROUND OF THE INVENTION

Halogen additives, such as those based on chlorine and bromine, have been used to give flame retardant properties to TPU compositions. In recent years, certain end use applications are specifying that the TPU composition be halogen free. This has required TPU formulators to search for other flame retardants to replace the previously used halogen additives.

Japanese Patent 54-85242 issued to Ozaki discloses resin compositions, including TPU, with from 3 to 33.3 weight percent melamine cyanurate for flame retardancy. The one example with TPU shows a level of 23 weight percent of melamine cyanurate.

U.S. Pat. No. 5,837,760 issued to Hackl et al. discloses the use of organic phosphates and/or organic phosphonates alone or as a mixture with melamine derivatives, such as melamine cyanurate, as flame retardants in TPU. The compositions are said to have 35–80 weight percent TPU, 3–15 weight percent organic phosphates and/or phosphonates, and if required, 0–50 weight percent melamine derivatives, with the weight percent based on a mixture of TPU and phosphate.

U.S. Pat. No. 5,110,850 issued to Farkas discloses using derivative free melamine at a level of 30–40 weight percent as a flame retardant for TPU.

U.S. Pat. No. 5,684,071 issued to Mogami et al. discloses an additive for thermoplastics for flame retardancy and mechanical properties which is a heterocyclic compound, such as melamine cyanurate, that is coated with a compound having at least two functional groups, such as epoxy. The surface treated melamine cyanurate is used at a level of 2–50 weight percent of the polymer resin, which would be from 2–33.3 weight percent of the composition.

EP 0389768 A2 issued to Scarso discloses using melamine cyanurate with phosphates and magnesium hydroxide as flame retardant in TPU.

U.S. Pat. No. 5,037,869 issued to Sprenkle and U.S. Pat. No. 4,321,189 issued to Ohshita et al. discloses using melamine cyanurate in polyamide molding resins.

Melamine cyanurate is a known flame retardant for use in TPU and other thermoplastics but its use at high levels has been avoided in TPU because of its detrimental effect on the physical properties, such as tensile strength and molecular weight, of the TPU.

It would desirable to use melamine cyanurate at high levels in TPU compositions while achieving good tensile strength and molecular weight.

SUMMARY OF THE INVENTION

It is an object of the present invention to make a non-halogen flame retarded TPU composition which has high levels of melamine cyanurate while maintaining high ultimate tensile strength.

It is a further object of the present invention to make a TPU composition which can be used as a jacket in a wire and cable construction and pass both the UL-1581 section 1080 and UL-1581 section 1080, subject 758 section G tests.

It is another object of the present invention to make a TPU composition which although the composition has a low limiting oxygen index (% LOI), will also have a low peak rate of heat release (PRHR) value.

It is another object of the present invention to have a process for making a TPU composition which is suitable for flame retarded jacketing in wire and cable construction.

Another object of the invention is a one step process of compounding and extruding into a jacket to make wire and cable construction.

Yet another object of the present invention is to improve a flame retardant composition which contains a degrading flame retardant additive by adding a small amount of a cross linking agent when making the TPU polymer used in the TPU composition.

These and other objects are accomplished by using a thermoplastic polyurethane (TPU) composition comprising from about 28 to about 50 weight percent of melamine cyanurate as the sole organic flame retardant additive, wherein said TPU composition has an ultimate tensile strength greater than 1500 psi and the TPU polymer in the TPU composition has a weight average molecular weight (Mw) greater than 70,000 Daltons as measured on a finished product.

In one aspect, the level of melamine cyanurate is from about 34 to about 45 weight percent of the TPU composition. Another aspect is a level of from about 35 to about 45 weight percent of the TPU composition.

In one aspect, the preferred Mw of the TPU composition is from about 85,000 to about 180,000 Daltons. Another aspect is a Mw of from about 100,000 to about 160,000 Daltons.

The preferred ultimate tensile strength of the TPU composition is at least 2900 psi, and more preferred is an ultimate tensile strength of at least 3500 psi, when the TPU composition is used as a wire and cable jacket.

The TPU composition has a LOI less than 24 while having a PRHR less than 310 KW/m$^2$.

DETAILED DESCRIPTION OF THE INVENTION

The thermoplastic polyurethanes (TPU for short) compositions of the present invention comprise at least one TPU polymer along with an additive of melamine cyanurate to achieve good flame retardancy.

The TPU polymer type used in this invention can be any conventional TPU polymer that is known to the art and in the literature as long as the TPU polymer has adequate molecular weight. The TPU polymer is generally prepared by reacting a polyisocyanate with an intermediate such as a hydroxyl terminated polyester, a hydroxyl terminated polyether, a hydroxyl terminated polycarbonate or mixtures thereof, with one or more chain extenders, all of which are well known to those skilled in the art.

The hydroxyl terminated polyester intermediate is generally a linear polyester having a number average molecular weight (Mn) of from about 500 to about 10,000, desirably from about 700 to about 5,000, and preferably from about 700 to about 4,000, an acid number generally less than 1.3 and preferably less than 0.8. The molecular weight is determined by assay of the terminal functional groups and is related to the number average molecular weight. The polymers are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from ε-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like, 1,4-butanediol is the preferred glycol.

Hydroxyl terminated polyether intermediates are polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethyl glycol) comprising water reacted with tetrahydrofuran (PTMG). Polytetramethylene ether glycol (PTMEG) is the preferred polyether intermediate. Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. These are available from BASF as Poly THF B, a block copolymer, and poly THF R, a random copolymer. The various polyether intermediates generally have a number average molecular weight (Mn), as determined by assay of the terminal functional groups which is an average molecular weight, of from about 500 to about 10,000, desirably from about 500 to about 5,000, and preferably from about 700 to about 3,000.

The polycarbonate-based polyurethane resin of this invention is prepared by reacting a diisocyanate with a blend of a hydroxyl terminated polycarbonate and a chain extender. The hydroxyl terminated polycarbonate can be prepared by reacting a glycol with a carbonate.

U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecular with each alkoxy group containing 2 to 4 carbon atoms. Diols suitable for use in the present invention include aliphatic diols containing 4 to 12 carbon atoms such as butanediol-1,4, pentanediol-1,4, neopentyl glycol, hexanediol-1,6, 2,2,4-trimethylhexanediol-1,6, decanediol-1,10, hydrogenated dilinoleylglycol, hydrogenated dioleylglycol; and cycloaliphatic diols such as cyclohexanediol-1,3, dimethylolcyclohexane-1,4, cyclohexanediol-1,4, dimethylolcyclohexane-1,3, 1,4-endomethylene-2-hydroxy-5-hydroxymethyl cyclohexane, and polyalkylene glycols. The diols used in the reaction may be a single diol or a mixture of diols depending on the properties desired in the finished product.

Polycarbonate intermediates which are hydroxyl terminated are generally those known to the art and in the literature. Suitable carbonates are selected from alkylene carbonates composed of a 5 to 7 membered ring having the following general formula:

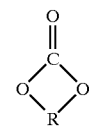

where R is a saturated divalent radical containing 2 to 6 linear carbon atoms. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate.

Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate, and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° C. to 300° C. and at a pressure in the range of 0.1 to 300 mm of mercury in the presence or absence of an ester interchange catalyst, while removing low boiling glycols by distillation.

More specifically, the hydroxyl terminated polycarbonates are prepared in two stages. In the first stage, a glycol is reacted with an alkylene carbonate to form a low molecular weight hydroxyl terminated polycarbonate. The lower boiling point glycol is removed by distillation at 100° C. to 300° C., preferably at 150° C. to 250° C., under a reduced pressure of 10 to 30 mm Hg, preferably 50 to 200 mm Hg. A fractionating column is used to separate the by-product glycol from the reaction mixture. The by-product glycol is taken off the top of the column and the unreacted alkylene carbonate and glycol reactant are returned to the reaction vessel as reflux. A current of inert gas or an inert solvent can be used to facilitate removal of by-product glycol as it is formed. When amount of by-product glycol obtained indicates that degree of polymerization of the hydroxyl terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl terminated polycarbonate is condensed by distilling off glycol as it is formed at 100° C. to 300° C., preferably 150° C. to 250° C. and at a pressure of 0.1 to 10 mm Hg until the desired molecular weight of the hydroxyl terminated polycarbonate is attained. Molecular weight (Mn) of the hydroxyl terminated polycarbonates can vary from about 500 to about 10,000 but in a preferred embodiment, it will be in the range of 500 to 2500.

Suitable extender glycols (i.e., chain extenders) are lower aliphatic or short chain glycols having from about 2 to about 10 carbon atoms and include for instance ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol hydroquinone di(hydroxyethyl) ether, neopentyglycol, and the like, with 1,4-butanediol being preferred.

The desired TPU polymer used in the TPU composition of this invention is generally made from the above-noted intermediates such as a hydroxyl terminated polyesters, polyether, or polycarbonate, preferably polyether, which is further reacted with a polyisocyanate, preferably a diisocyanate, along with extender glycol desirably in a so-called one-shot process or simultaneous coreaction of polyester, polycarbonate or polyether intermediate, diisocyanate, and extender glycol to produce a high molecular weight linear TPU polymer. The preparation of the macroglycol is generally well known to the art and to the literature and any suitable method may be used. The weight average molecular weight (Mw) of the TPU polymer is generally about 80,000 to 500,000, and preferably from about 90,000 to about 250,000. The equivalent weight amount of diisocyanate to the total equivalent weight amount of hydroxyl containing components, that is the hydroxyl terminated polyester, polyether, or poycarbonate, and chain extender glycol, is from about 0.95 to about 1.10, desirably from about 0.96 to about 1.02, and preferably from about 0.97 to about 1.005. Suitable diisocyanates include aromatic diisocyanates such as: 4,4'-methylenebis-(phenyl isocyanate) (MDI); m-xylylene diisocyanate (XDI), phenylene-1,4-diisocyanate, naphthalene-1,5-diisocyanate, diphenylmethane-3,3'-dimethoxy-4,4'-diisocyanate and toluene diisocyanate (TDI); as well as aliphatic diisocyanates such as isophorone diisocyanate (IPDI), 1,4-cyclohexyl diisocyanate (CHDI), decane-1,10-diisocyanate, and dicyclohexylmethane-4,4'-diisocyanate. The most preferred diisocyanate is 4,4'-methylenebis(phenyl isocyanate), i.e., MDI. When a higher molecular weight TPU polymer is desired, it can be achieved by using a small amount of a cross linking agent having a functionality greater than 2.0 to induce cross linking. The amount of cross linking agent used is preferably less than 2 mole percent of the total moles of chain extender, and more preferably less than 1 mole percent. A particularly desirable method to increase the molecular weight in the preferred TPU polymer is to replace less than 1 mole percent of the 1,4-butanediol chain extender with trimethylol propane (TMP).

The method of adding a cross linking agent in the manufacture of the TPU polymer is effective in improving the flame retardancy of a TPU composition when any flame retardant additive is used which will degrade the TPU polymer when the TPU is exposed to melt processing temperatures. A slight cross linking of the TPU polymer increases its molecular weight and allows it to perform better in a fire situation. When using the cross linking agent in the TPU polymer, flame retardant additives such as melamine, melamine phosphate, melamine cyanurate, melamine borate, other melamine derivatives, organic phosphates, organic phosphonates, and other flame retardants known in the art to degrade TPU polymers, the flame retardancy performance in UL-94 or UL-1581 type tests of the TPU composition is improved. Mixtures of the above flame retardants can also be used, such as a mixture of melamine cyanurate together with an organic phosphate or organic phosphonate to create a flame retarded TPU composition having improved performance in UL-94 or UL-1581 type test by using a cross linking agent.

The cross linking is accomplished by adding a cross linking agent having a functionality greater than 2.0 together with the hydroxyl terminated intermediate, the isocyanate compound, and chain extender in the reaction mixture to manufacture the TPU polymer. The amount of cross linking agent used in the reaction mixture to make the TPU polymer will depend on the desired molecular weight and the effectiveness of the particular cross linking agent used. Usually, less than 2.0 mole percent, and preferably less than 1.0 mole percent, based on the total moles of chain extender used in making the TPU polymer are used. Levels of cross linking agent less than 0.05 mole percent of the total moles of chain extender would not give a meaningful improvement in flame performance. Levels of cross linking agent greater than 2.0 mole percent, based on the total moles of chain extender would be difficult to melt process. Therefore, the level of cross linking agent used is from about 0.05 mole percent to about 2.0 mole percent based on the total moles of chain extender.

The cross linking agents can be any monomeric or oligomeric materials which have a functionality of greater than 2.0 and have the ability to cross link the TPU polymer. Such materials are well known in the art of thermoset polyurethanes. They include trimethylol propane (TMP), pentaerythritol, amines, 3-isocyanato-methyl-3,5,5-trimethylcyclo-hexyl isocyanate (IPDI), and the like. Trimethylol propane has been found to particularly be a desirable cross linking agent.

In the one-shot polymerization process which generally occurs in situ, a simultaneous reaction occurs between three components, that is the one or more intermediates, the one or more polyisocyanates, and the one or more extender glycols, with the reaction generally being initiated at temperatures of from about 100° C. to about 120° C. Inasmuch as the reaction is exothermic, the reaction temperature generally increases to about 220° C.–250° C.

The additive to the TPU polymer used in this invention to achieve the desired flame retardant properties of the TPU composition is melamine cyanurate. It is important that the melamine cyanurate be the only organic flame retardant additive in the TPU composition. Melamine cyanurate is used at a level of from about 28 to about 50 weight percent of the TPU composition, preferably from about 34 to about 45 weight percent, and more preferably from about 35 to about 45 weight percent of the TPU composition. Levels less than 28 weight percent do not give the desired flame retardency, whereas levels greater than 50 weight percent tend to reduce the physical properties (i.e., tensile strength and molecular weight) to an unacceptable level. The required level of melamine cyanurate to achieve a given flame retardency is also influenced by the type of TPU polymer used in the TPU composition. A polyether TPU polymer will normally require less melamine cyanurate than a polyester TPU polymer.

Other conventional inorganic flame retardants may be used in the TPU composition along with the melamine cyanurate. Suitable inorganic flame retardants include any of those known to those skilled in the art, such as ammonium phosphate, ammonium polyphosphate, calcium carbonate, antimony oxide and clay including montmorillonite clay which is often referred to as nano-clay. The inorganic flame retardants may be used at a level of from 0 to about 10 weight percent of the TPU composition, preferably from 0 to about 5 weight percent. More preferably, the inorganic flame retardants are not present and the only flame retardant is melamine cyanurate.

The melamine cyanurate used can be purchased from multiple suppliers, such as from DSM. The particle size of the melamine cyanurate is generally less than 50 microns, preferably less than 35 microns; and more preferred about 25 microns or less. Any size particle of the melamine cyanurate may be used, but preferably a small particle size is used to impart a smoother surface to finished parts made with the TPU composition. A particular desirable melamine cyanurate is one supplied by DSM as Melapur MC-25, which has 99% of the particles with a particle size smaller than or equal to 25 microns.

Other additives, which are not flame retardants, may be used in the TPU compositions of this invention. Additives such as colorants, antioxidants, antiozonates, light stabilizers, inhert fillers, and the like may be used in amounts of from 0 to 5 weight percent of the TPU composition, peferably from 0 to 2 weight percent.

The TPU polymer, melamine cyanurate, and other additives, if used, may be compounded together by any means known to those skilled in the art. To make the TPU composition of this invention, the TPU polymer is melted at a temperature of about 150° C. to 215° C., preferably from about 160–190° C. and more preferably from about 170–180° C. The particular temperature used will depend on the particular TPU polymer used, as is well understood by those skilled in the art. The TPU polymer and the melamine cyanurate are blended to form an intimate physical mixture. Blending can occur in any commonly used mixing device, but a twin screw extruder having multiple heat zones with multiple feeding ports is preferably used for the blending and melting process (compounding). The TPU polymer, melamine cyanurate, and other additives, if used, may be preblended before adding to the compounding extruder or they may be added or metered into the compounding extruder in different streams and in different zones of the extruder. It has been found that it is preferred to add the melamine cyanurate into the extruder downstream from where the TPU polymer is added. The term downstream is used to refer to a location nearer the exit die end of the extruder and farther from the feed end of the extruder. This will give the TPU composition less heat history while in contact with the melamine cyanurate, as the melamine cyanurate tends to degrade the TPU polymer. More heat history when the melamine cyanurate is present, results in more degradation. For this reason, it is desirable to melt the TPU polymer before adding the melamine cyanurate by either a longer residence time in the extruder zone where the TPU polymer is added or by increasing the temperature of the zone where the TPU polymer is added or both actions can be taken. The melamine cyanurate must be added early enough to obtain proper dispersion. In a 4 zone compounding extruder, for example, the melamine cyanurate would be added in zone 2 and/or 3, while the TPU polymer is added in zone 1. Adding the melamine cyanurate in zone 1 would give added degradation while adding the melamine cyanurate in zone 4 could result in poor dispersion. Other additives that do not effect the degradation of the TPU polymer can be added in any of the zones, but should be added early enough to obtain good dispersion, such as in zone 1, 2 or 3 of a 4 zone extruder. The resultant TPU composition with the melamine cyanurate and other ingredients, if used, being well dispersed throughout the TPU polymer matrix exits the extruder die in a molten state and is normally pelletized and stored for further use in making finished articles.

The TPU composition of this invention must have an ultimate tensile strength, as measured according to ASTM D412, greater than 1500 psi, preferably greater than 2900 psi and more preferred is greater than 3500 psi.

The desired ultimate tensile strength of the TPU composition of this invention depends on the end use application. For example, in more demanding wire and cable jacketing applications, the ultimate tensile strength must be greater than about 2900 psi and preferably greater than 3500 psi. Other applications which are not as critical as the demanding wire and cable jacketing such as blown film, moldings, and the like, can use lower ultimate tensile strength, such as greater than 1500 psi. It is also important to note that the ultimate tensile strength referred to in this disclosure is the tensile strength measured on the TPU composition after it is processed into the finished part. Each time the TPU composition is heated for further thermal processing (compounding, extruding into jacket, and the like), the ultimate tensile strength will decrease as will the Mw also decrease.

The TPU compositions of this invention must have a weight average molecular weight (Mw), as measured according to gel permeation chromatography (GPC) against polystyrene standard, greater than about 70,000 Daltons, preferably from about 85,000 to about 180,000 Daltons, more preferably from about 100,000 to about 160,000 Daltons. The melamine cyanurate, when mixed with the TPU polymer, tends to degrade the polymer somewhat and therefore lowers the Mw of the TPU polymer. Because of this, the TPU polymer needs to have a higher Mw than the desired Mw of the final TPU composition. For each 10 weight percent of melamine cyanurate added to the TPU polymer, the Mw of the TPU polymer will be lowered by about 10,000 to about 20,000 Daltons. Therefore, to achieve a desired Mw in the TPU composition, a higher molecular weight TPU polymer should be used in the TPU composition, than that desired in the final TPU composition. It is important to note that when the molecular weight of the TPU composition is referred to in this specification, we are referring to the molecular weight of the TPU polymer component of the TPU composition after the TPU polymer has been compounded with all of the other ingredients making up the TPU composition and processed, such as by extrusion, into a finished product.

The Mw referred to directly above is the Mw measured on the TPU composition after it is processed into the finished part. Just like the tensile strength, the Mw will decrease each time the TPU composition is heat processed. For wire and cable jacket applications, the Mw of the TPU composition should be at least 100,000 Daltons, as measured on the extruded jacket. Therefore, the TPU polymer used in the TPU composition for a wire and cable jacket must be much higher than 100,000 Daltons. The Mw of the starting TPU polymer to achieve this will depend on the level of melamine cyanurate used, and the processing temperature and time (heat history). The heat history needed to make a particular finished product will be somewhat equipment specific and desired finished product specific all of which can be easily determined by those skilled in the art, with minimum experimentation. If after testing it is found that a higher Mw is desired, one can replace a portion of the 1,4-butanediol chain extender in the TPU polymer with trimethylol propane. Usually, only about 1 mole percent, based on the total moles of chain extender, or less of trimethylol propane is used to replace the 1,4-butanediol. Of course, if an even higher Mw TPU composition is desired, the level of trimethylol propane in the TPU polymer can be further increased until the desired Mw of the TPU composition is achieved.

The TPU compositions of this invention, because of their flame retardant properties, abrasion resistance and good tensile strength, are particularly suited for use as jacketing for electrical conductors in wire and cable construction applications, such as jacketing for armored cable, industrial robotic equipment, non-metallic sheath cable, deep well pump cables and other multiple conductor assemblies. A typical wire and cable construction will have at least one and typically will have multiple electrical conductors, usually from 2 to 8 conductors, such as copper wires. Each conductor will typically be coated, normally by extrusion, with a thin layer of polymeric insulation compound which can be polyvinyl chloride, polyethylene, cross-linked polyethylene, fluorocarbon polymers, and the like. The multiple insulated conductors may be wrapped with metal, a fiberglass or other non-flamable textile. The multiple conductors are then encased in a jacket material (i.e., the TPU composition of this invention) to protect the electrical conductors. It is necessary for this jacket material to be flame resistant in case a fire occurs.

The types of wire and cable constructions that are most suitable for using a jacket made from the TPU compositions of this invention are detailed in the UL-1581 standard. The UL-1581 standard contains specific details of the conductors, of the insulation, of the jackets and other coverings, and of the methods of sample preparation, of specimen selection and conditioning, and of measurement and calculation that are required in standards for Thermoset-Insulated Wires and Cables (UL-44), Thermoplastic-Insulated Wires and Cables (UL-83), Flexible Cord and Fixture Wire (UL-62), and Service-Entrance Cables (UL-854).

The UL-44 standard covers Nos. 14-4/0 AWG and 213-2000 kcmil sizes of Types XHHW-2, XHHW, XHH, RHW-2, RHH, RHW, SIS, and SA for use in accordance with Article 310 and other applicable parts of the National Electrical Code. Deep-well pump cables and other multiple-conductor assemblies to which a type-letter designation is not assigned are included in the UL-44 requirements. The UL-83 standard covers Nos. 14-4/0 AWG and 250-2000 kcmil sizes of 600-V, single-conductor, thermoplastic insulated wires and cables for use in accordance with the National Electrical Code. Single conductors for use in armored cable and non-metallic sheath cable, deep-well pump cables, and other multiple-conductor assemblies to which no type-letter designations are assigned are included in these requirements. The UL-62 standard covers fixture wires, hoistway cables, and flexible cords for use in accordance with the National Electrical Code. The UL-854 standard covers Type USE and USE-2 (below-ground) and Type SE (above-ground) power cables for installation in accordance with Article 338 and other applicable parts of the National Electrical Code.

The fire performance of a wire and cable construction can be influenced by many factors, with the jacket being one factor. The flammability of the insulation material can also effect the fire performance of the wire and cable construction, as well as other inner components, such as paper wrappings, fillers, and the like.

The wire and cable constructions of this invention are made by extruding the TPU composition onto the bundle of insulated conductors to form a jacket around the insulated conductors. The thickness of the jacket depends on the requirements of the desired end use application. Typical thickness of the jacket is from about 0.010 to 0.200 inches and more typical from about 0.020 to about 0.050 inches. The TPU compositions may be extruded into the jacket from previously made TPU composition. Usually the TPU composition is in the form of pellets for easy feeding into the extruder. This is the most common method since the TPU composition is not normally made by the same party that makes the wire and cable construction. The wire and cable jacket could be extruded directly from the compounding extruder without going through the separate step of pelletizing the TPU composition. This one-step compounding/extrusion process would eliminate one heat history step for the TPU composition.

A particular way to flame retard polymers is to use intumescent systems. The term intumescent refers to foamed char formed on a surface of a polymeric material during fire exposure. The char layer protects the underlying material from the action of the flame and acts as a physical barrier, limiting the diffusion of combustible volatile products toward the flame and of oxygen toward the polymer. Consequently, the charred coating slows down heat and mass transfer between the gas and the condensed phase.

Neat TPU (TPU polymer without flame retardant additives), on high heat flux or flame applications, undergoes degradation in two successive steps. The first step is via de-polymerization between 240° C. and 400° C. with the rate of weight loss maximal at 320° C. The second step of degradation occurs between 400° C. and 700° C. which leads to 0% residue. Due to de-polymerization, the molecular weight of the TPU polymer and, in turn, its melt viscosity decreases, thus causing a heavy dripping of the polymer melt. The melted TPU polymer drips while it is burning, during and shortly after ignition. In wire and cable construction, the dripping melt exposes a fresh surface of polymer to the fire and spreads the flame beyond the site of initial ignition. The flame will extinguish only if the melt dripping away exposes a bare metal wire surface of the electrical conductor.

Melamine, when used alone as a flame retardant in a TPU composition, vaporizes or sublimes at temperatures greater than 350° C. When dissociating, melamine absorbs heat at about 470 Kcal/mole, thus acting as a heat sink. In addition, gaseous ammonia generated during melamine decomposition may interfere in the gas phase and deny oxygen to the fuel source. Melamine alone does not prevent TPU melt from dripping. This is why it is customary to use char formers and an acid catalyst with melamine to induce carbonization of the char former. With the melamine cyanurate containing TPU compositions of this invention, it is not necessary to use additional char formers.

It was surprising to find that in the TPU compositions of this invention which contains only melamine cyanurate as the flame retardant, that melamine cyanurate is effective as a char former. In the presence of melamine cyanurate, there is a high temperature residue during TPU burning. In neat TPU, the residue is essentially zero. Melamine cyanurate forms, or helps to form, carbon char on the wire and cable surface, thereby protecting the remaining polymer layer from dripping and/or from combining with oxygen to propagate the flame. The mode of action for flame retardancy of the melamine cyanurate in the TPU composition appears to be via formation of a brittle, foamy intumescent char coating. At below the level of concentration of melamine cyanurate recited in this description, the rate and thickness of char formation are insufficient to prevent melt dripping. Therefore, the flame either propagates along the wire or the polymer melt drips away and exposes the bare wire surface. At high enough concentration, as disclosed in this specification, a state appears to be reached where the rate of char formation is faster than the rate of resin melting and dripping away. Clearly, both the rate of formation and thickness of the char are critical to the flame behavior of jacketing in wire and cable applications. The rate of the crust formation is also different depending on the type of TPU polymer used in the TPU composition of this invention. The ether TPU polymer appears to form a crust at a faster rate than an ester TPU polymer. The ether TPU polymer is the preferred TPU polymer for use in the TPU composition of this invention, as the ester TPU polymer requires a higher level of melamine cyanurate to pass the flame specifications for wire and cable jacket applications.

For many polymers, the limiting oxygen index (LOI) can be linearly related to char formation. That is, the higher the LOI, the better the char formation. The LOI is the minimum percentage of oxygen which allows a sample to sustain combustion under specified conditions in a candle-like fashion, and thus may be considered to measure the ease of extinction of a sample. The LOI test has been formalized as ASTM D2863. The LOI of the TPU compositions of this invention are relatively low, only 22–24. It was very unexpected to find that a material with a low LOI, such as the TPU compositions of this invention, could pass the demanding requirements of UL-1581 flammability tests and actually performed better than halogenated flame retardant TPU which had a significantly higher LOI. The TPU compositions of this invention also performed better than a non-halogenated TPU with a LOI of 30 and a commercial TPU sold for jacketing with a LOI of 25.

There are many flammability tests used for classifying materials with respect to flame resistance, such as UL subject 94 vertical (UL-94 V) burning test, NFPA 701, and UL-1581, as well as others. Each of these tests was designed to address problems presented by a specific product design and application, which could not be predicted by other test procedures. Thus, if a product passed one type of flame test, it does not mean it would pass also a flame test done at a higher flame temperature, a different geometry, a different thickness, or in the final construction of the article.

The flame retardant TPU compositions of this invention passed the flame retardant requirements for products covered by Underwriters Laboratories Inc. (UL) such as VW-1 (section 1080 of UL-1581) and subject 758 section G of UL-1581 section 1080. The TPU compositions of this invention do not pass UL-94 Vo specification. UL-94 is an insufficient test for thermoplastic compounds used in armored cable, non-metallic sheath cable, and deep well pump cables as the compositions are self extinguished. UL-94 is performed on individual components of the wire and cable construction, rather than the entire construction. Section 1080 of UL-1581 and subject 758 section G of UL-1581 section 1080 are commonly performed on these products.

Both of the above UL-1581 tests use a sample specimen of wire and cable construction which is 18 inches long and is placed in the test chamber in a verticle position. A specified flame is applied to the center of the 18 inch specimen, as specified in the standard test procedure. The UL-1581 section 1080 test applies the flame for 15 seconds each, a total of 5 times. The flame is stopped after each 15 seconds application for 15 seconds or until the specimen stops flaming, whichever is longer. The verticle specimen shall not convey flame along its length and shall not convey flame to combustible materials in its vicinity in order to pass the test. The UL-1581 section 1080 subject 758 section G test applies the flame for 1 minute each, a total of 3 times. The flame is stopped for 30 seconds after each 1 minute flame application. The cable shall not convey flame either during or after the 3 flame applications, and no burning particles shall fall from the cable in order to pass the test.

In recent years, it has become increasingly the consensus that the best fire tests are those which have some correlation to real fires. It is now widely accepted that the single most important descriptor of the size of a fire is the rate of heat release. In a small scale, the rate of heat release is usually measured by the NIST rate of heat release with a Cone Calorimeter. The TPU compositions of this invention were measured for PRHR using a Cone Calorimeter according to ASTM E-1354 with a heat flux of 35 kW/m$^2$. The peak rate of heat release (PRHR) is considered to be a variable expressing the best of the maximum intensity of a real fire and this test value is frequently used as an input into fire hazard models. Normally, with most materials, the LOI value and PRHR value are reciprocal, i.e., as LOI goes higher, the PRHR decreases. It was, therefore, quite surprising and unexpected that inspite of the low LOI of the TPU compositions of this invention, their PRHR was also low. The TPU compositions of this invention when used for wire and cable jacketing will preferably have a LOI % less than about 25 and a PRHR less than about 310 kW/m$^2$ as measured by a cone calorimeter test. More preferred, the TPU compositions will have a LOI % less than 24 and a PRHR less than 295 kW/m$^2$.

The invention will be better understood by reference to the following examples.

EXAMPLES

Examples 1–3 are presented to show three different TPU polymers with various levels of melamine cyanurate (MC) to create a TPU composition of this invention. In Example 1, a polyester TPU polymer is used, whereas in Examples 2 and 3, a polyether TPU polymer was used to make the TPU composition of this invention.

Tables I and II are presented to summarize the data generated from Examples 1–3. Table I shows that melamine cyanurate is effective at high levels in a TPU composition to allow the TPU composition to pass both UL-1581 section 1080 and UL-1581 section 1080, section G subject 758 tests while achieving the desired ultimate tensile strength. Table II shows the LOI and PRHR data for selected runs in Examples 1–3, as measured by the Cone Calorimeter test. The data shows that although the TPU compositions of this invention have a relatively low LOI, they also have a low PRHR value. Run 15 in Table II is a comparative sample of a commercial flame retarded TPU composition containing a polyether TPU polymer.

The polyether TPU polymers used in Examples 2 and 3 to make the TPU composition was a poly(ether urethane) made by reacting PTMEG (polytetramethylene ether glycol) as the hydroxyl terminated polyether intermediate with 1,4-butanediol as the chain extender and MDI as the diisocyanate. Two molecular weight polyether TPU polymers were used in the Examples (identified in the Examples as Ether A and Ether B). The higher Mw Ether B used less than 1 mole percent of trimethylol propane to replace an equivalent mole percent of the 1,4-butanediol chain extender. The poly(ester urethane) TPU polymer used to make the TPU composition of this invention in Example 1 was made by reacting poly(tetramethylene adipate) glycol as the hydroxyl terminated polyester intermediate with 1,4-butanediol as the chain extender and MDI as the diisocyanate. The poly(ester urethane) TPU polymer is identified as Ester A in the Example 1.

The TPU polymer was dried at 80° C. for about 16 hours prior to being compounded with melamine cyanurate to make the TPU composition.

The TPU polymer, together with the melamine cyanurate were compounded in a Warner Pfeider ZSK30 twin screw extruder having 4 heating zones, and operating at 100 RPM with a feed rate of 25 pounds per hours. Zone 1 is the feed end of the extruder while zone 4 is the zone next to the exit die. The TPU polymer was added to zone 1 (the feed end) and melted while being conveyed to zone 2. The melamine cyanurate used was Melapur MC-25 from DSM, and had a particle size of 25 microns or less. The melamine cyanurate was added downstream of the TPU polymer in zone 2 of the twin screw extruder. The mixture was thoroughly blended as it was conveyed through zones 3 and 4. The two streams of TPU polymer and MC were metered into their respective zones of the extruder at a rate which would determine the ultimate level of MC in the TPU compositions. The compounded TPU compositions exited the heated (360° F.) extruder die. The TPU composition output of the compounding extruder was pelletized and stored for extrusion into wire and cable jacket.

The TPU compositions were extruded into a wire and cable jacket by using a single screw Kilion extruder having 3 heat zones and operating at 45 RPM. The heating zones were operated at 320–325° F. and the die temperatures was 350° F. The extruded jacket had a thickness of 0.035 inches (35 mils).

In the examples, the control runs having no MC (Runs 1, 5, and 11) were run through the same processing equipment as were the runs having MC. The control runs were not made into jacket, but were extruded into sheet form to allow for physical properties measurement.

Example 1

Melamine cyanurate was added to a polyester TPU polymer by compounding as mentioned above to create a TPU composition. The levels of melamine cyanurate used was 0, 16.9, 31.5, and 48.5 weight percent of the TPU composition as shown in Runs 1–4 Runs 2–4 were extruded into jacketing for wire and cable, while the control (Run 1) was extruded into sheet.

| Run No. | TPU Polymer Type | WT. % Melamine Cyanurate |
|---|---|---|
| 1 (control) | Ester A | 0 |
| 2 | Ester A | 16.9 |
| 3 | Ester A | 31.5 |
| 4 | Ester A | 48.5 |

Example 2

Melamine cyanurate was added to a polyether TPU polymer (Ether A) by compounding as mentioned above to create a TPU composition. The levels of melamine cyanurate used was 0, 14.9, 15.5, 32.8, 45.4, and 50.6 weight percent of the TPU composition as shown in Runs 5–10. Runs 6–10 were extruded into wire and cable jacket, while the control (Run 5) was extruded into sheet.

| Run No. | TPU Polymer Type | WT. % Melamine Cyanurate |
|---|---|---|
| 5 (control) | Ether A | 0 |
| 6 | Ether A | 14.9 |
| 7 | Ether A | 15.5 |
| 8 | Ether A | 32.8 |
| 9 | Ether A | 45.4 |
| 10 | Ether A | 50.6 |

Example 3

Melamine cyanurate was added to a polyether TPU polymer (Ether B) by compounding as mentioned above to create a TPU composition. The levels of melamine cyanurate used was 0, 15.0, 30.5, and 44.4 weight percent of the TPU composition as shown in Runs 11–14. Runs 12–14 were extruded into wire and cable jacket, while the control (Run 11) was extruded into sheet.

| Run No. | TPU Polymer Type | WT. % Melamine Cyanurate |
|---|---|---|
| 11 (control) | Ether B | 0 |
| 12 | Ether B | 15.0 |
| 13 | Ether B | 30.5 |
| 14 | Ether B | 44.4 |

The test data on molecular weight (Mw), ultimate tensile strength, and flame tests UL-1581 section 1080 and UL-1581 section 1080 subject 758 section G are shown in Table I. All physical tests were performed on extruded jacket, except the control runs (Runs 1,5 and 11) where Mw was determined on extruded sheet. The flame tests were performed on a wire and cable construction.

Table II shows the Cone Calorimeter data for selected Runs. Runs No. 15 in Table II is a commercial product known as Elastollan 1185A 10 FHF and is sold by BASF or a related company known as Elastogran GmbH. Run 15 is believe to be made according to U.S. Pat. No. 5,837,760 and contains MC together with an organic phosphate as the flame retardant package in a polyether TPU. All Cone Calorimeter data was measured using a 0.125 inch thick sample, according to ASTM E-1354 and a heat flux of 35 kW/m$^2$.

| Run No. | WT. % MC | Molecular WT. Daltons Mw | ULT. Tensile Psi | UL-1581 Sec. 1080 | After-Flame UL-1581 Sec. 1080 (sec.)* | UL-1581 Sec. 1080 Subject 758, Section G | After-Flame UL-1581 Sec. 1080 Subject 758, Section G (sec.)* |
|---|---|---|---|---|---|---|---|
| 1. | 0 | 148,575 | — | — | — | — | — |
| 2. | 16.9 | 112,508 | 7760 | Fail** | 0, 0, 2, 1, bare wire | Fail** | Drip |
| 3. | 31.5 | 111,115 | 4810 | Pass*** | 2, 8, 2, 1, bare wire | Fail** | 3, 32, 0 (bare wire) |
| 4. | 48.5 | 70,590 | 1950 | Pass*** | 1, 1, 0, 0, 0 | Pass*** | 0, 0, 0 |
| 5. | 0 | 136,195 | — | — | — | — | — |
| 6. | 14.9 | 111,890 | 6110 | Fail** | — | Fail** | Drip |
| 7. | 15.5 | — | — | Pass*** | 1, 0, 0, 6, bare wire | Fail** | — |
| 8. | 32.8 | 104,800 | 3700 | Pass*** | 1, 1, 14, 7, 10 | Pass*** | 10, 20, 0 (bare wire) |
| 9. | 45.4 | — | — | Pass*** | 2, 1, 0, 0, 0 | Pass*** | — |
| 10. | 50.6 | 89,290 | 1600 | Pass*** | — | Pass*** | 0, 0, 0 |
| 11. | 0 | 194,100 | — | — | — | — | — |
| 12. | 15.0 | 178,730 | 6140 | Fail** | — | Fail** | Drip |
| 13. | 30.5 | 152,812 | 4250 | Pass*** | 23, 12, 0, 0, 0 | Pass*** | 8, 2, 0 |
| 14. | 44.4 | 116,332 | 1730 | Pass*** | 2, 0, 0, 0, 0 | Pass*** | 2, 0, 0 |

*Seconds that sample continued to flame after test flame removed each time during test
**Failed - Dripping and exposing bare wire
***Pass - a thick char is formed which insulates the substrate and prevents its melting on a subsequent application of flame.

From Table I, it can be seen that Runs 4, 8, 9, 10, 13 and 14 all passed both flame tests (UL-1581 section 1080 and UL-1581 section 1080 subject 758 section G). Runs 3 and 7 passed the UL-1581 section 1080 test but failed the UL-1581 section 1080 subject 758 section G test, which is a more severe test because the flame is applied for one minute rather than 15 second intervals.

It can be seen by comparing Run 3 with Run 13 that a polyether TPU polymer (Run 13) in the TPU composition does not require as much MC as when a polyester TPU (Run 3) is used to pass both of the flame tests. Run 3, although it contained 1 weight percent higher MC than did Run 13, Run 3 failed the more severe flame test (UL-1581 section 1080 subject 758 section G.

The data also shows that as MC level is increased, the Mw and ultimate tensile strength decrease. For demanding specifications on wire and cable jacket applications, Runs 4, 10 and 14 would be unsuitable because of their low ultimate tensile strength, although these formulations passed both of the flame tests. These particular formulations are useful for other applications which demand flame retardancy, but do not require the high tensile strength of demanding specifications of a wire and cable jacket. Some less demanding wire and cable specifications could use these formulations. Only Runs 8, 9, and 13 are suitable for the more demanding wire and cable jacket applications.

From Table I, it can also be seen that the Ether B TPU polymer used in Runs 11–14 maintains a higher molecular weight than does Ether A used in Runs 5–10. The Ether B TPU polymer was made with less than 1 mole percent of trimethylol propane cross linking agent replacing an equivalent mole percent of the 1,4-butanediol chain extender.

| Run No. | LOI* % | Time to Ignition (sec) | PRHR** KW/m$^2$ | Peak Mass Loss Rate (G/sec/m$^2$) | Avg. Specific Extinction Area (M$^2$/Kg) |
|---|---|---|---|---|---|
| 11 | — | 69.0 | 2600 | — | 384 |
| 12 | — | 25.7 | 567 | 22 | 490 |
| 13 | 23 | 27.5 | 289 | 14 | 320 |
| 14 | — | 22.6 | 224 | 12 | 130 |
| 9 | — | 27.2 | 306 | 14 | 290 |
| 15 (comparative) | 25 | 51 | 380 | — | 420 |

*measured according to ASTM D2863
**measured according to ASTM E-1354 with a heat flux of 35 kW/m$^2$ with a Cone Calorimeter The data in Table II show that although Run 13 has a lower LOI % that Run 15, Run 13 also has a substantially lower PRHR. This is very unexpected and a beneficial feature of this invention. PRHR is a variable that is often used in fire hazard models and is indicative of real fire performance. The comparative (Run 15) is a commercial product for flame retardant jacket known as Ellastollan 1185A 10 FHF and is sold by BASF or a related company known as Elastogran GmbH. The comparatives (Run 15) material is believed to be made according to U.S. Pat. No. 5,837,760 and contains MC together with an organic phosphate as the flame retardant package in a polyether TPU.

While in accordance with the Patent statutes, the best mode and preferred embodiment has been set forth, the scope of the invention is not limited thereto, but rather by the scope of the attached claims.

What is claimed is:

1. A flame retardant thermoplastic polyurethane composition comprising:
   (a) at least one thermoplastic polyurethane polymer, said thermoplastic polyurethane polymer made by reacting at least one hydroxyl terminated intermediate with at least one isocyanate and at least one chain extender, wherein a cross linking agent having a functionality of greater than 2.0 is added at a level of from about 0.05 to about 2.0 mole percent based on the total moles of said chain extender; and (b) at least one flame retardant additive capable of lowering the molecular weight of said thermoplastic polyurethane polymer during melt processing of said thermoplastic polyurethane composition.

2. A flame retardant thermoplastic polyurethane composition of claim 1 wherein the amount of said cross linking agent present is a level of from about 0.2 to about 1.0 mole percent based on the total moles of said chain extender present in said thermoplastic polyurethane composition.

3. A flame retardant thermoplastic polyurethane composition of claim 2 wherein said flame retardant additive is selected from melamine, melamine cyanurate, melamine borate, melamine phosphate, melamine derivatives, organic phosphates, organic phosphonates and mixtures thereof.

4. A flame retardant thermoplastic polyurethane composition of claim 3 wherein said thermoplastic polyurethane polymer is a polyether polyurethane polymer and said flame retardant is melamine cyanurate and said cross linking agent is trimethylol propane.

5. A wire and cable construction capable of passing both the requirements of UL-1581 section 1080 and UL-1581 section 1080 subject 758 section G tests comprising:

(a) at least one metal conductor wherein said conductor is insulated with a non-conducting polymeric material; and (b) a flame retarded jacket covering said insulated metal conductor; wherein said jacket is a thermoplastic polyurethane composition comprising:
(i) at least one thermoplastic polyurethane polymer; and
(ii) from about 28 to about 50 weight percent of melamine cyanurate as the sole organic flame retardant additive; said weight percent based on the weight of said composition, and wherein said thermoplastic polyurethane composition has an ultimate tensile strength greater than 2900 psi and a weight average molecular weight (Mw), as measured on said thermoplastic polyurethane polymer in a finished article, greater than 100,000 Daltons.

6. A wire and cable construction of claim 5 wherein said melamine cyanurate is present at a level of from about 34 to about 45 weight percent.

7. A wire and cable construction of claim 6 wherein said melamine cyanurate is present at a level of from about 35 to about 45 weight percent.

8. A wire and cable construction of claim 5 wherein said thermoplastic polyurethane composition has a molecular weight of from about 100,000 to about 160,000 Daltons.

9. A wire and cable construction of claim 5 wherein said thermoplastic polyurethane polymer is selected from polyether polyurethane, polyester polyurethane and polycarbonate polyurethane.

10. A wire and cable construction of claim 5 wherein said thermoplastic polyurethane polymer is a polyether polyurethane.

11. A wire and cable construction of claim 5 wherein said thermoplastic polyurethane polymer is a blend of at least one polyether polyurethane and at least one polyester polyurethane.

12. A wire and cable construction of claim 5 wherein said thermoplastic polyurethane composition has an ultimate tensile strength greater than 3500 psi.

13. A wire and cable construction of claim 12 wherein said thermoplastic polyurethane polymer has a molecular weight of from about 100,000 to about 160,000 Daltons and wherein said melamine cyanurate is present at a level of from about 35 to about 45 weight percent.

14. A wire and cable construction of claim 5 wherein said construction has from 2 to 8 insulated metal conductors that are covered by said flame retarded jacket.

15. A wire and cable construction of claim 14 wherein said construction has from 3 to 5 insulated metal conductors that are covered by said flame retarded jacket.

16. A process for producing a wire and cable construction capable of passing both the requirements of UL-1581 section 1080 and UL-1581 section 1080 subject 758 section G tests comprising:

(a) extruding an insulation layer of a non-conducting polymeric material onto at least one metal conductor; and (b) extruding a flame retardant jacket to cover said insulated metal conductor; wherein said jacket is a thermoplastic polyurethane composition comprising:
(i) at least one thermoplastic polyurethane polymer; and
(ii) from about 28 to about 50 weight percent of melamine cyanurate as the sole organic flame retardant additive, said weight percent based on the weight of said composition, and wherein said thermoplastic polyurethane composition has an ultimate tensile strength greater than 2900 psi and a weight average molecular weight (Mw), as measured on said thermoplastic polyurethane polymer in a finished article, greater than 100,000 Daltons.

17. A process of claim 16 wherein said melamine cyanurate is present at a level of from about 34 to about 45 weight percent.

18. A process of claim 17 wherein said melamine cyanurate is present at a level of from about 35 to about 45 weight percent.

19. A process of claim 16 wherein said thermoplastic polyurethane composition has a molecular weight of from about 100,000 to about 160,000 Daltons.

20. A process of claim 16 wherein said thermoplastic polyurethane polymer is selected from polyether polyurethane, polyester polyurethane, and polycarbonate polyurethane.

21. A process of claim 20 wherein said thermoplastic polyurethane polymer is a polyether polyurethane.

22. A process of claim 16 wherein said thermoplastic polyurethane polymer is a blend of at least one polyether polyurethane and at least one polyester polyurethane.

23. A process of claim 16 having an ultimate tensile strength greater than 3500 psi.

24. A process of claim 23 wherein said thermoplastic polyurethane polymer has a molecular weight of from about 100,000 to about 160,000 Daltons and wherein said melamine cyanurate is present at a level of from about 35 to about 45 weight percent.

25. A process of claim 16 wherein said wire and cable construction has from 2 to 8 insulated metal conductors that are covered by said flame retardant jacket.

26. A process of claim 25 wherein said metal conductors in said wire and cable construction are insulated by a layer of a polymeric material selected from polyvinyl chloride, polyethylene, cross-linked polyethylene, and fluorocarbon polymer and wherein said insulated metal conductors are covered by said flame retarded jacket.

27. A process of claim 16 wherein said thermoplastic polyurethane composition ingredients are mixed in a twin screw extruder having a feed end and a die end and said extruder having multiple heat zones and multiple feed ports between said feed end and said die end; wherein said melamine cyanurate is added to said extruder in a heat zone which is closer to said die end than the heat zone where said thermoplastic polyurethane polymer is added to said extruder; and wherein said thermoplastic polyurethane composition exiting said die end of said extruder is formed into said jacket for said wire and cable construction prior to cooling to ambient temperature and without first going through a pelletizing step.

28. A thermoplastic polyurethane composition having a LOI % less than about 25, as measured according to ASTM D2863, and a PRHR less than about 310 kW/m$^2$, as measured by a Cone Calorimeter according to ASTM E-1354 with a heat flux of 35 kW/m$^2$.

29. A thermoplastic polyurethane composition of claim 28 having a LOI % less than about 24 and a PRHR less than about 295 kW/m$^2$.

* * * * *